US008429196B2

(12) United States Patent
Chandrasekar et al.

(10) Patent No.: US 8,429,196 B2
(45) Date of Patent: Apr. 23, 2013

(54) FAST EXTRACTION OF SCALAR VALUES FROM BINARY ENCODED XML

(75) Inventors: Sivasankaran Chandrasekar, Menlo Park, CA (US); Ning Zhang, Palo Alto, CA (US); Sam Idicula, Mountain View, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 196 days.

(21) Appl. No.: 12/134,196

(22) Filed: Jun. 6, 2008

(65) Prior Publication Data
US 2009/0307239 A1 Dec. 10, 2009

(51) Int. Cl.
*G06F 7/00* (2006.01)
*G06F 17/30* (2006.01)

(52) U.S. Cl.
USPC ............................................. 707/797

(58) Field of Classification Search .......... 707/797, 707/798, 802–807, 999.001–999.01, 999.1, 707/999.101–999.107, 999.2–999.206; 715/205–209, 234
See application file for complete search history.

(56) References Cited

U.S. PATENT DOCUMENTS

| 5,295,261 | A | 3/1994 | Simonetti |
| 5,404,513 | A | 4/1995 | Powers et al. |
| 5,467,471 | A | 11/1995 | Bader |
| 5,680,614 | A | 10/1997 | Bakuya et al. |
| 5,724,577 | A | 3/1998 | Exley et al. |
| 5,734,887 | A | 3/1998 | Kingberg et al. |
| 5,878,415 | A | 3/1999 | Olds |
| 5,974,407 | A | 10/1999 | Sacks |
| 5,987,506 | A | 11/1999 | Carter et al. |
| 6,003,040 | A | 12/1999 | Mital et al. |
| 6,038,563 | A | 3/2000 | Bapat et al. |
| 6,055,544 | A | 4/2000 | DeRose et al. |

(Continued)

FOREIGN PATENT DOCUMENTS

| EP | 1 241589 A2 | 9/2002 |
| JP | 61-251944 | 11/1986 |

(Continued)

OTHER PUBLICATIONS

U.S. Appl. No. 11/317,101, filed Dec. 22, 2005, Office Action, Jul. 7, 2010.

(Continued)

*Primary Examiner* — Hosain Alam
*Assistant Examiner* — Reza Hosseini
(74) *Attorney, Agent, or Firm* — Hickman Palermo Truong Becker Bingham Wong LLP; Daniel D. Ledesma

(57) ABSTRACT

Techniques are provided for efficiently extracting scalar values from binary-encoded XML data. Node information is stored in association with binary-encoded XML data to indicate whether one or more nodes of an XML document are simple or complex. A node is simple if the node has no child elements and no attributes. The node information of a particular node is used to determine whether a particular node, identified in a query, is simple or complex. If the particular node is simple, then the scalar value of the particular node is identified without performing any operations other than possibly converting the scalar value to a non-binary-encoded format or converting the scalar value to a value of a different data type.

26 Claims, 2 Drawing Sheets

U.S. PATENT DOCUMENTS

| | | | |
|---|---|---|---|
| 6,061,684 A | 5/2000 | Glasser et al. | |
| 6,115,705 A | 9/2000 | Larson | |
| 6,128,610 A | 10/2000 | Srinivasan et al. | |
| 6,141,655 A | 10/2000 | Johnson et al. | |
| 6,154,741 A | 11/2000 | Feldman | |
| 6,189,012 B1 | 2/2001 | Mital et al. | |
| 6,199,195 B1 | 3/2001 | Goodwin et al. | |
| 6,208,993 B1 | 3/2001 | Shadmone | |
| 6,236,988 B1 | 5/2001 | Aldred | |
| 6,263,332 B1 | 7/2001 | Nasr et al. | |
| 6,269,380 B1 | 7/2001 | Terry et al. | |
| 6,279,006 B1 | 8/2001 | Shigemi et al. | |
| 6,279,007 B1 | 8/2001 | Uppala | |
| 6,298,349 B1 | 10/2001 | Toyoshima et al. | |
| 6,330,573 B1 | 12/2001 | Salisbury et al. | |
| 6,343,287 B1 | 1/2002 | Kumar et al. | |
| 6,356,920 B1 | 3/2002 | Vandersluis | |
| 6,360,302 B1 | 3/2002 | Baylor | |
| 6,366,934 B1 | 4/2002 | Cheng et al. | |
| 6,370,537 B1 | 4/2002 | Gilbert et al. | |
| 6,414,610 B1 | 7/2002 | Smith | |
| 6,427,123 B1 | 7/2002 | Sedlar | |
| 6,470,344 B1 | 10/2002 | Kothuri et al. | |
| 6,487,546 B1 | 11/2002 | Witkowski | |
| 6,496,842 B1 | 12/2002 | Lyness | |
| 6,510,434 B1 | 1/2003 | Anderson et al. | |
| 6,519,597 B1 | 2/2003 | Cheng et al. | |
| 6,539,398 B1 | 3/2003 | Hannan et al. | |
| 6,542,911 B2 | 4/2003 | Chakraborty et al. | |
| 6,571,231 B2 | 5/2003 | Sedlar | |
| 6,604,100 B1 | 8/2003 | Fernandez et al. | |
| 6,609,121 B1 | 8/2003 | Ambrosini et al. | |
| 6,635,088 B1 | 10/2003 | Hind et al. | |
| 6,636,845 B2 | 10/2003 | Chau et al. | |
| 6,643,633 B2 | 11/2003 | Chau et al. | |
| 6,654,761 B2 | 11/2003 | Tenev et al. | |
| 6,662,342 B1 | 12/2003 | Marcy | |
| 6,684,227 B2 | 1/2004 | Duxbury | |
| 6,697,805 B1 | 2/2004 | Choquier et al. | |
| 6,704,739 B2 | 3/2004 | Craft et al. | |
| 6,704,747 B1 | 3/2004 | Fong | |
| 6,708,186 B1 | 3/2004 | Claborn et al. | |
| 6,718,322 B1 | 4/2004 | Brye | |
| 6,721,723 B1 | 4/2004 | Gibson et al. | |
| 6,725,212 B2 | 4/2004 | Couch et al. | |
| 6,754,661 B1 | 6/2004 | Hallin et al. | |
| 6,772,350 B1 | 8/2004 | Belani et al. | |
| 6,785,673 B1 | 8/2004 | Fernandez et al. | |
| 6,801,224 B1 | 10/2004 | Lewallen | |
| 6,826,727 B1 | 11/2004 | Mohr et al. | |
| 6,836,778 B2 | 12/2004 | Manikutty et al. | |
| 6,836,857 B2 | 12/2004 | Ten-Hove et al. | |
| 6,883,137 B1 | 4/2005 | Girardot et al. | |
| 6,915,304 B2 | 7/2005 | Krupa | |
| 6,915,307 B1 | 7/2005 | Mattis et al. | |
| 6,920,457 B2 | 7/2005 | Pressmar | |
| 6,957,237 B1 | 10/2005 | Traversat et al. | |
| 6,964,025 B2 | 11/2005 | Angiulo et al. | |
| 7,013,425 B2 | 3/2006 | Kataoka | |
| 7,031,956 B1 | 4/2006 | Lee et al. | |
| 7,043,488 B1 | 5/2006 | Bauer et al. | |
| 7,080,094 B2 | 7/2006 | Dapp et al. | |
| 7,089,239 B1 | 8/2006 | Baer et al. | |
| 7,089,567 B2 | 8/2006 | Girardot et al. | |
| 7,113,942 B2 | 9/2006 | Levanoni et al. | |
| 7,134,072 B1 | 11/2006 | Lovett et al. | |
| 7,139,746 B2 | 11/2006 | Shin et al. | |
| 7,143,397 B2 | 11/2006 | Imaura | |
| 7,162,485 B2 | 1/2007 | Gottlob et al. | |
| 7,171,404 B2 | 1/2007 | Lindblad et al. | |
| 7,171,407 B2 | 1/2007 | Barton et al. | |
| 7,174,354 B2 | 2/2007 | Andreasson | |
| 7,216,127 B2 | 5/2007 | Auerbach | |
| 7,406,522 B2 | 7/2008 | Riddle | |
| 7,451,128 B2 | 11/2008 | Song et al. | |
| 7,457,910 B2 | 11/2008 | Chang et al. | |
| 7,523,119 B2 | 4/2009 | Imamura et al. | |
| 7,523,199 B2 | 4/2009 | Tsuyama et al. | |
| 2001/0049818 A1 | 12/2001 | Banerjia et al. | |
| 2002/0056025 A1 | 5/2002 | Qiu et al. | |
| 2002/0073019 A1 | 6/2002 | Deaton | |
| 2002/0078068 A1 | 6/2002 | Krishnaprasad et al. | |
| 2002/0087596 A1 | 7/2002 | Lewontin | |
| 2002/0116371 A1 | 8/2002 | Dodds et al. | |
| 2002/0116457 A1 | 8/2002 | Eshleman et al. | |
| 2002/0133484 A1 | 9/2002 | Chau et al. | |
| 2002/0143512 A1 | 10/2002 | Shamoto et al. | |
| 2002/0156811 A1 | 10/2002 | Krupa | |
| 2002/0184188 A1 | 12/2002 | Mandyam et al. | |
| 2002/0184401 A1 | 12/2002 | Kadel, Jr. et al. | |
| 2003/0004937 A1 | 1/2003 | Salmenkaita et al. | |
| 2003/0009361 A1 | 1/2003 | Hancock et al. | |
| 2003/0033287 A1* | 2/2003 | Shanahan et al. | 707/3 |
| 2003/0065659 A1 | 4/2003 | Agarwal et al. | |
| 2003/0069881 A1 | 4/2003 | Huttunen | |
| 2003/0078906 A1 | 4/2003 | Ten-Hove et al. | |
| 2003/0093672 A1 | 5/2003 | Cichowlas | |
| 2003/0101194 A1 | 5/2003 | Rys et al. | |
| 2003/0115421 A1 | 6/2003 | McHenry et al. | |
| 2003/0140308 A1 | 7/2003 | Murthy et al. | |
| 2003/0172135 A1 | 9/2003 | Bobick et al. | |
| 2003/0182624 A1 | 9/2003 | Large | |
| 2003/0212662 A1 | 11/2003 | Shin et al. | |
| 2003/0236903 A1 | 12/2003 | Piotrowski | |
| 2004/0043758 A1 | 3/2004 | Sorvari et al. | |
| 2004/0044659 A1* | 3/2004 | Judd et al. | 707/3 |
| 2004/0064466 A1 | 4/2004 | Manikutty et al. | |
| 2004/0066529 A1 | 4/2004 | Wu et al. | |
| 2004/0088320 A1 | 5/2004 | Perry | |
| 2004/0088415 A1 | 5/2004 | Chandrasekar et al. | |
| 2004/0132465 A1 | 7/2004 | Mattila et al. | |
| 2004/0148278 A1 | 7/2004 | Milo et al. | |
| 2004/0176958 A1 | 9/2004 | Salmenkaita et al. | |
| 2004/0220912 A1 | 11/2004 | Manikutty et al. | |
| 2004/0225680 A1 | 11/2004 | Cameron et al. | |
| 2004/0230667 A1 | 11/2004 | Wookey | |
| 2004/0260691 A1 | 12/2004 | Desai et al. | |
| 2004/0261019 A1 | 12/2004 | Imamura et al. | |
| 2004/0267760 A1 | 12/2004 | Brundage et al. | |
| 2004/0268244 A1 | 12/2004 | Levanoni et al. | |
| 2005/0050016 A1 | 3/2005 | Stanoi et al. | |
| 2005/0050058 A1 | 3/2005 | Jain et al. | |
| 2005/0050092 A1 | 3/2005 | Jain et al. | |
| 2005/0091588 A1* | 4/2005 | Ramarao et al. | 715/522 |
| 2005/0097084 A1 | 5/2005 | Balmin et al. | |
| 2005/0102256 A1 | 5/2005 | Bordawekar et al. | |
| 2005/0203957 A1 | 9/2005 | Wang et al. | |
| 2005/0228818 A1 | 10/2005 | Murthy et al. | |
| 2005/0228828 A1* | 10/2005 | Chandrasekar et al. | 707/104.1 |
| 2005/0278616 A1* | 12/2005 | Eller | 715/513 |
| 2005/0289125 A1 | 12/2005 | Liu et al. | |
| 2006/0005122 A1* | 1/2006 | Lemoine | 715/513 |
| 2006/0021246 A1 | 2/2006 | Schulze et al. | |
| 2006/0047646 A1* | 3/2006 | Maluf et al. | 707/4 |
| 2006/0047717 A1 | 3/2006 | Pereira | |
| 2006/0059165 A1* | 3/2006 | Bosloy et al. | 707/10 |
| 2006/0129524 A1 | 6/2006 | Levanoni et al. | |
| 2006/0129584 A1 | 6/2006 | Hoang et al. | |
| 2006/0136761 A1 | 6/2006 | Frasier et al. | |
| 2006/0200439 A1 | 9/2006 | Bhatia et al. | |
| 2006/0212467 A1* | 9/2006 | Murthy et al. | 707/101 |
| 2006/0236224 A1* | 10/2006 | Kuznetsov et al. | 715/513 |
| 2006/0277289 A1* | 12/2006 | Bayliss et al. | 709/223 |
| 2007/0005624 A1 | 1/2007 | Wu et al. | |
| 2007/0043751 A1 | 2/2007 | Chen et al. | |
| 2007/0050704 A1 | 3/2007 | Liu | |
| 2007/0113221 A1 | 5/2007 | Liu et al. | |
| 2007/0150432 A1 | 6/2007 | Chandrasekar et al. | |
| 2007/0198467 A1 | 8/2007 | Wiser et al. | |
| 2008/0082484 A1 | 4/2008 | Averbuch et al. | |
| 2008/0091623 A1* | 4/2008 | Idicula et al. | 705/400 |
| 2008/0098001 A1* | 4/2008 | Gupta et al. | 707/10 |
| 2008/0120351 A1 | 5/2008 | Khaladkar et al. | |
| 2008/0120608 A1* | 5/2008 | Shetty et al. | 717/144 |
| 2009/0112890 A1 | 4/2009 | Medi et al. | |
| 2009/0125495 A1 | 5/2009 | Zhang et al. | |

| | | | |
|---|---|---|---|
| 2009/0125693 | A1 | 5/2009 | Idicula et al. |
| 2009/0150412 | A1* | 6/2009 | Idicula et al. .................. 707/100 |
| 2009/0216715 | A1* | 8/2009 | Dexter .............................. 707/3 |

FOREIGN PATENT DOCUMENTS

| | | |
|---|---|---|
| JP | 62-245352 | 10/1987 |
| JP | 04-004438 | 1/1992 |
| WO | WO 00/49533 A2 | 8/2000 |
| WO | WO 01/42881 A2 | 6/2001 |
| WO | WO 01/59602 A1 | 8/2001 |
| WO | WO 01/61566 A1 | 8/2001 |
| WO | WO 03107576 A2 | 12/2003 |
| WO | WO 2006026534 A2 | 3/2006 |

OTHER PUBLICATIONS

U.S. Appl. No. 11/743,563, filed May 2, 2007, Office Action, Jun. 28, 2010.

Tomoharu, Asami, "Development of Database System by XML, Relaxer, and JDBC", partial English translation, XML Press, Gijutsu-Hyohron Co., Jul. 10, 2001, vol. 3, 2 pages.

Makoto, Onizuka, "XML and Database", partial English translation, XML Magazine, Shoeisha Co., Ltd., Jul. 1, 2000, vol. 10, No. 3, 1 page.

Hironobu, Koyaku, "What is brought to SQL Server 2000 by XML?", partial English translation, Enterprise Servers, IDG Japan, Dec. 1, 2000, vol. 3, No. 12, 1 page.

Bayardo et al., "An Evaluation of Binary XML Encoding Optimizations for Fast Stream Based XML Processing" WWW2004 10 pages.

Chakraborty, Krishnendu, "The XML Garbage Collector", The Source for Developers, Sun Developer Network Site XP-002297849, Mar. 2002.

Chen, Ruey-Shun et al., "Developing an XML framework for metadata system", Trinity College Dublin, Proc. of the 1st Inter. Sympo. on Information and Communication, pp. 267-272.

Cheng, Josephine et al., "IBM DB2 XML Extender," IEEE, ICDE '00 Conference, San Diego, Feb. 2000, 128 pages. "EE XML/Binary CFI File Handling Library User Manual" downloaded from the Internet. "EE XML/Binary CFI File Handling Library User Manual" downloaded from the Internet <http://www.smos.esa.int/BinaryXML/SO-UM-DME-LIPP-0005-BINXML-FH-SUM-E2-RO.pdf > 49 pages.

Liefke et al., "Xmill: an efficient compressor for XML data", May 2000, ACM SIGMOD Record, Proceedings of the 2000 ACM SIGMOD international conference on Management of data SIGMOD 00', vol. 29 Issue 2, Publisher: ACM Press, 12 pages.

Liu et al., "XML retrieval: Configurable indexing and ranking for XML information retrieval", Jul. 2004, Proceedings of the 27th annual international ACM SIGIR conference on Research and development in information retrieval SIGIR 04', Pulished by ACM press, 12 pages.

Lo et al., "XAS: A System for Accessing Componentized, Virtual XML Documents," IEEE, 2001, pp. 493-502.

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

Martin et al., "WAP Binary XML Content Format" downloaded from the Internet Aug. 6, 2007< http://www.w3.org/TR/wbxml/ > 15 pages.

Min et al., "XML Indexing and compression: XPRESS: a queriable compression for XML data", Jun. 2003, Proceedings of the 2003 ACM SIGMOD international conference on Management of data SIGMOD 03', Published by ACM Press, 8 pages.

Myllymaki, Jussi, "Effective Wed data Extraction with Standard XML Technologies," WWW10, May 1-5, 2001, pp. 689-696.

Noser, Hansrudi, et al., "Dynamic 3D Visualization of Database-Defined Tree Structures on the WWW by Using Rewriting Systems," 2000, IEEE, XP-002262516, pp. 247-254.

Oracle XML DB Developer's Guide 11gR1, Oct. 2007, http://download.oracle.com/docs/cd/B28359_01/appdev.111/b28369.pdf.

Peng, Feng et al., "XPath queries on streaming data" (2003) ACM Press, pp. 431-442.

Schmidt et al., "Why and How to Benchmark XML Databases," SIGMOND Record, vol. 3, No. 3, Sep. 2001, pp. 27-32.

Vion-Dury, Jean-Yves, "XPath on left and right sides of rules: toward compact XML tree rewriting through node patterns" (2003) ACM Press, pp. 19-25.

Vorthmann, S. et al. "Beyond Schemas, Schema Adjuncts and the Outside World," Markup Languages, Online!, vol. 2, No. 3, Jun. 2000, pp. 1-8.

Yoshikawa, Masatoshi et al., "XRel: A Path-Based Approach to Storage and Retrieval of XML Documents Using Relational Databases", XP-001143686, ACM Transactions on Internet Technology (2001), pp. 110-141.

"Zapthink" downloaded from the Internet Aug. 6, 2007< http://www.zapthink.com/report.html?id=ZAPFLASH-11162004 > 3 pages.

Zisman et al., "Using XML to Build Consistency Rules for Distributed Specifications," Proceedings of the Tenth International Workshop on Software Specification and Design (IWSD'00), IEEE 2000, 8 pages.

Zou et al., "XML Processing: Ctree: a compact tree for indexing XML data" Nov. 2004, Proceedings of the 6th annual international workshop on Web information and data management WIDM 04', Published by ACM Press, 10 pages.

Zhang, et al., "TDX: A High Performance Table-driven XML Parser", In proceedings of the 44th annual (ACM) Southeast Regional Conference, Mar. 2006, ACM, 6 pages.

Balmin et al., "Incremental Validation of XML Documents", ACM Trans. Database System 24, Dec. 2004, 42 pages.

Bruce, C.S. 2003. "CubeWerx Position Paper for Binary Interchange of XML". In Proceedings of W3C Workshop on Binary Interchange of XML Information Item Sets (The Santa Clara, The USA, Sep. 24-26, 2003) 10 pages.

Peer to Patent, Third Party submission for PGPUB 20090125495, "optimized streaming evaluation of xml queries", Sep. 1, 2009.

Xiaogana Li, Agrawal, "Efficient Evaluation of XQuery over Streaming Data", 2005, $31^{st}$ VLDB Conference, pp. 265-276.

IBM Research, "XAOS: An Algorithm for Streaming XPath Processing with Forward and Backward Axes" 2003, pp. 1-2.

"Binary XML Library" downloaded from the Internet Aug. 6, 2007, <http://www.smos.esa.int/BinaryXML/ > 2 pages.

U.S. Appl. No. 11/743,563, filed May 2, 2007, Notice of Allowance, Apr. 19, 2011.

U.S. Appl. No. 11/938,020, filed Nov. 9 ,2007, Interview Summary, mailed Nov. 2, 2012.

* cited by examiner

FAST EXTRACTION OF SCALAR VALUES FROM BINARY ENCODED XML

CROSS-REFERENCE TO RELATED APPLICATIONS

This application is related to U.S. patent application Ser. No. 11/743,563, filed May 2, 2007, entitled "TECHNIQUES FOR EFFICIENT LOADING OF BINARY-ENCODED XML DATA," by Gupta et al, the entire contents of which are hereby incorporated by reference for all purposes as if fully set forth herein.

FIELD OF THE INVENTION

Embodiments of the invention described herein relate generally to processing XML data, and, more specifically, to techniques for efficiently performing a streaming evaluation of an XPath expression on XML data.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

XML

Database systems often store XML-formatted data within their databases. This data may come from a variety of sources, though the source is often an XML document or a database object.

In XML, data items known as elements are delimited by an opening tag and a closing tag. An element may also comprise attributes, which are specified in the opening tag of the element. Text between the tags of an element may represent any sort of data value, such as a string, date, or integer.

Text within an element may alternatively represent one or more elements. Elements represented within the text of another element are known as subelements or child elements. Elements that store subelements are known as parent elements. Since subelements are themselves elements, subelements may, in turn, be parent elements of their own subelements. Parent elements and elements with attributes are considered "complex elements" whereas elements that have neither children elements nor attributes are considered "simple elements." Attributes, like elements, are considered nodes. Attributes are also considered to be "simple" because they never have child elements or attributes.

The resulting hierarchical structure of XML-formatted data is often discussed in terms akin to those used to discuss a family tree. For example, a subelement is said to descend from its parent element or any element from which its parent descended. A parent element is said to be an ancestor element of any subelement of itself or of one of its descendant elements. Collectively, an element along with its attributes and descendants, are often referred to as a tree or a subtree.

XML Schema

XML Schema is a definition language that provides facilities for describing structure and constraining the contents of an XML document. A draft specification, referred to hereinafter as "XML Schema Specification", for the XML Schema definition language is described in a set of three documents published by the W3C Consortium. The first document in the set is "XML Schema Part 0: Primer Second Edition", W3C Recommendation 28 Oct. 2004, located at "http://www.w3.org/TR/xmlschema-0/", the entire contents of which are hereby incorporated by reference for all purposes as if fully set forth herein. The second document in the set is "XML Schema Part 1: Structures Second Edition", W3C Recommendation 28 Oct. 2004, located at "http://www.w3.org/TR/xmlschema-1/", the entire contents of which are hereby incorporated by reference for all purposes as if fully set forth herein. The third document in the set is "XML Schema Part 2: Datatypes Second Edition", W3C Recommendation 28 Oct. 2004, located at "http://www.w3.org/TR/xmlschema-2/", the entire contents of which are hereby incorporated by reference for all purposes as if fully set forth herein.

As referred to herein, an XML schema is a defined structure for one or more XML documents. An XML schema representation is data that describes the XML structure. An XML schema representation may include an XML document with declarations and/or a tokenized XML representation which is one for which tokens have been generated. An example of an XML schema representation includes, but is not limited to, an XML document with type definitions, element declarations, or attribute declarations.

Binary-Encoded XML

Binary-encoded XML is one format in which XML data may be stored in a database. Binary-encoded XML is taught, for example, in "TECHNIQUES FOR EFFICIENT LOADING OF BINARY XML DATA," incorporated above and also in U.S. patent application Ser. No. 11/182,997, filed Jul. 14, 2005, entitled "ENCODING OF HIERARCHICALLY ORGANIZED DATA FOR EFFICIENT STORAGE AND PROCESSING," by Murthy et al, the entire contents of which are hereby incorporated by reference for all purposes as if fully set forth herein. Embodiments of the invention are not limited to any particular method for encoding XML data into a binary format.

Binary-encoded XML is a compact binary representation of XML that was designed to reduce the size of XML documents. One of the ways XML data may be compressed into binary-encoded XML is by representing strings ("tokens") with fixed values.

In one implementation of binary-encoded xml, a mapping is established between character strings and replacement values, where the character strings are tag names, and the replacement values are numbers. Such mappings are referred to herein as "translation information".

For example, consider an XML document PO1 that contains the following content:

```
<PurchaseOrder>
    <item>
        Important Data
    </item>
</PurchaseOrder>
```

PO1 includes the tokens PurchaseOrder and item. To store PO1 in binary-encoded XML format, the token 'PurchaseOrder' may be mapped to 1, and the token 'item' may be mapped to 2. Typically, the replacement values consume much less space than the corresponding tokens. For example, the token 'PurchaseOrder', which contains fourteen characters, may be assigned a binary replacement value that takes less space to store than a single text character.

Once translation information has been created, XML documents may be stored in binary-encoded XML based on the translation information. For example, PO1 may be stored as <1><2>Important Data</2></1>. In typical implementations of binary-encoded xml, even the symbols (e.g. "<", ">", and "/") may be represented by binary replacement values.

Translating Between Binary-Encoded XML and Text

When stored in binary-encoded XML, an XML document consumes much less space than is required by other formats of XML storage. However, the space savings is achieved at the cost of additional overhead required to convert textual XML to binary-encoded XML, and to convert binary-encoded XML to textual XML. For example, to be meaningful to an application that requests PO1, '<1><2>Important Data</2></1>' would have to be translated back into:

```
<PurchaseOrder>
    <item>
        Important Data
    </item>
</PurchaseOrder>
```

In order to reconstruct the text of an XML document that has been stored in binary format, the translation information that was used to encode the XML document must be available. The translation information that is used to store XML data within a database are typically stored separate from the binary-encoded XML data itself.

Translation Information

How database system stores translation information may hinge on whether the translation information is for known-schema XML or for unknown-schema XML. XML data is "known-schema" XML if the database server knows the XML schema to which the XML data conforms. The database server may "know" the schema, for example, if the schema has been registered with the database server.

On the other hand, XML data is "unknown-schema" XML if the database server does not know the schema to which the XML data conforms. Thus, unknown-schema XML includes both (a) XML documents that do not conform to any schema and (b) XML documents that conform to an XML schema, but the XML schema is not known to the database server.

In some database systems, the translation information for known-schema binary-encoded XML is stored on a per-schema basis. Thus, since all documents that conform to a given schema will typically contain the same tag strings, the same translation information is used to encode all of the documents that conform to the given schema.

In some database systems, the translation information for known-schema binary-encoded XML is stored in a database as part of the definition of the schema. Schema definitions, in turn, are stored in a schema table.

In some database systems, translation information may not be required for known-schema binary-encoded XML. In such database systems, the algorithm for translating between binary-encoded XML and non-binary-encoded XML is well known, so that any component with access to an XML schema may determine a translation based solely on the XML schema.

For example, the following XML schema, hereinafter known as POSchema1 may have been used to encode PO1 above:

```
<?xml version="1.0" encoding="utf-8"?>
<xs:schema xmlns:xs="http://www.w3.org/2001/XMLSchema">
    <xs:element name="PurchaseOrder">
        <xs:complexType>
            <xs:sequence>
                <xs:element name="item" type="xs:int"
                    maxOccurs="2" />
            </xs:sequence>
        </xs:complexType>
    </xs:element>
</xs:schema>
```

Because 'PurchaseOrder' is the first element listed in the schema, it may have been encoded as the number 1. Likewise, since 'item' is the second element in the schema, it may have been encoded as the number 2. Other elements may be encoded using this same algorithm. An XML decoder may decode any document that follows this schema just by examining POSchema1 and being aware of this encoding algorithm.

In some database systems, the translation information for all unknown-schema binary-encoded XML is stored in tables referred to herein as "token tables". In one embodiment, three token tables are used to store the translation information for unknown-schema XML: a Qname token table, a namespace token table, and a path_id token table. The three token tables are collectively referred to as a "token table set".

The Qname token table for an XML schema contains the Qname-to-replacement-value mappings used to encode the Qnames contained in unknown-schema XML. The namespace token table for an XML schema contains the namespace-to-replacement-value mappings used to encode the namespaces contained in unknown-schema XML. The path_id token table for an XML schema contains the path_id-to-replacement-value mappings used to encode the path_ids contained in unknown-schema XML.

XML Query and XPath

It is important for object-relational database systems that store XML data to be able to execute queries using XML query languages. XML Query Language (XQuery) and XML Path Language (XPath) are important standards for a query language, which can be used in conjunction with SQL to express a large variety of useful queries. XPath is described in *XML Path Language (XPath)*, version 1.0 (W3C Recommendation 16 Nov. 1999), herein incorporated by reference and available at the time of writing at http://www.w3.org/TR/xpath, as well as in *XML Path Language (XPath)* 2.0 (W3C Recommendation 23 Jan. 2007), herein incorporated by reference and available at the time of writing at http://www.w3.org/TR/xpath. XQuery is described in *XQuery 1.0: An XML Query Language* (W3C Recommendation 23 Jan. 2007), herein incorporated by reference and available at the time of writing at http://www.w3.org/TR/xquery.

Streaming XPath Evaluation with Binary-Encoded XML

Some techniques for evaluating XML queries rely on normalizing an XML query to form a set of simple XPath expressions. The XPath expressions are then evaluated against a streamed XML data source using techniques that may be collectively referred to as streaming evaluation. Streaming evaluation techniques typically rely on an XPath evaluator built in to the database system where the XML data is stored. One streaming evaluation technique is discussed in U.S. Pat. No. 7,797,310, issued Sep. 14, 2010, entitled "Technique To Estimate The Cost Of Streaming Evaluation Of XPaths," by Idicula et al., which is hereby incorporated by reference for all purposes as if fully disclosed herein.

It is desirable to optimize streaming evaluation techniques in order provide more efficient evaluation of XPath expressions in a database system. Increased efficiency may allow for faster streaming evaluations, less demand on computer resources during streaming evaluation, or both.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
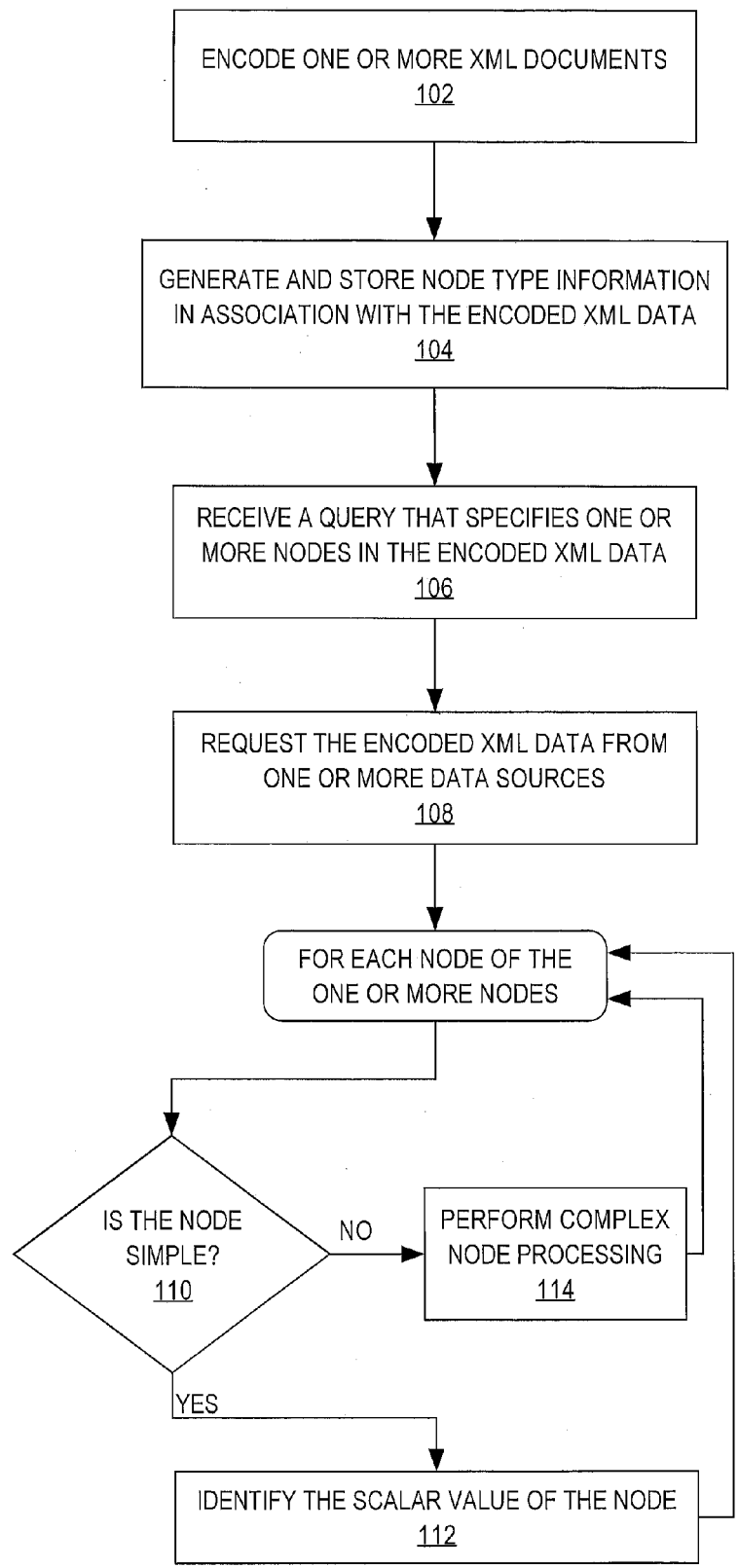
FIG. 1 is a flow diagram that depicts how the scalar value of a simple node is identified, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Database Overview

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row", and "column" shall be used herein to refer respectively to the data container, record, and field.

Functional Overview

Techniques are provided for extracting scalar values from binary-encoded XML data. With reference to FIG. 1, at step 102, one or more XML documents are encoded into a binary format, such as CSX. At step 104, node information is generated and stored in association with the binary-encoded XML data. Node information of a node indicates whether that node is "simple" or "complex". Node information may be stored in the binary-encoded XML data itself, such as in the binary-encoded version of the "start element" tag. Additionally or alternatively, node information may be part of an XML schema to which the XML data conforms.

At step 106, a query that specifies one or more nodes in the binary-encoded XML data is received. In response to a query, at step 108, the binary-encoded XML data is requested from one or more data sources. For each node specified in the query, node information for that node is used to determine whether that node is simple or complex (at step 110).

If the node is simple, then (at step 112) the scalar value of the node is identified and returned for further processing, according to the semantics of the query. In this way, minimal processing is required to extract the scalar value of the node. Such minimal processing at least includes decoding (or converting) the scalar value of the node into a non-binary form, such as a textual form of type string.

Alternatively, if the node is complex, then (at step 114) complex node processing is performed, which requires more processing resources than simply identifying the scalar value of the node.

To be clear, element nodes are not considered to "have" a text value. Rather, the text of an element is treated as a child node of that element. Thus, a simple element may have a child node that is a text node. On the other hand, attribute nodes are considered to "have" text values. The value of a simple element node or an attribute node is referred to herein as the "scalar value" of that node.

EXAMPLE

The following is only one example in which an embodiment of the invention may be employed. However, embodiments of the invention are not limited the following example.

A user submits the following query (Query A) against binary-encoded XML data:

```
SELECT p.desc
FROM purchase_order po,
     xmltable('/PurchaseOrder/LineItems/LineItem'
          passing po.object_value
          columns id number path '/LineItem/@ItemNumber'
                  desc varchar2(200) path '/LineItem/Description') p
WHERE p.id = 125;
```

Query A

The semantics of Query A are that all Description elements are selected and returned, from a purchase order table, whose corresponding ItemNumber attribute is equal to 125.

With respect to the syntax, Query A includes a reference to a purchase order table ('purchase_order') whose alias is 'po'. The purchase order table stores one or more XML documents as binary-encoded XML data.

Query A also includes the function 'xmltable' whose alias is 'p'. Execution of that function causes a virtual table to be constructed based on the three parameters of xmltable( ). The first parameter ('PurchaseOrder/LineItems/LineItem') is a path that identifies an element or a subtree in an XML document. In this example, the XML document is stored in the purchase order table.

The second parameter (passing po.object_value) specifies (via an alias in this case) the table (i.e., purchase_order) that stores binary-encoded XML data, which table is the table from which virtual table 'p' is constructed. The second parameter also specifies a column (object_value) of the specified table, which column is of type binary large object (BLOB).

The third parameter (columns) of xmltable( ) specifies two columns of the to-be-constructed virtual table. In other situations, the "column" parameter may identify more or less columns.

In this example, the columns of virtual table 'p' will include (1) an 'id' column of type number and (2) a 'desc' column of type variable character. The path that identifies the node values to be stored in the 'id' column is anchored at the node identified in the first parameter, which node is '/PurchaseOrder/LineItems/LineItem'. Thus, the path of the 'id' nodes is '/LineItem/@ItemNumber' and the path of the 'desc' nodes is '/LineItem/Description'.

XPath Evaluation

During compilation of Query A, a cost estimator may determine that an XML index cannot or should not be used to process Query A. Instead, it is determined that Query A should be executed "functionally" (i.e., without an index). Thus, the one or more XML documents that are required to answer the query are read from binary storage and may be analyzed in a streaming fashion. Thus, the entirety of the one or more XML documents are not required to be buffered before Query A is executed.

In a streaming evaluation, an XPath evaluator may be required to decode (or convert) the binary-encoded XML data from an XML input stream. The XML input stream comprises one or more XML data sources against which a set of one or more XPath expressions is to be run. Decoding may be necessary for several reasons. First, the steps in each XPath expression are typically based on non-encoded element and attribute names. To evaluate XML data against an XPath expression, the XML data might also be non-encoded. Second, the XPath evaluator usually outputs an XPath result with non-encoded XML. Therefore, the XPath evaluator may decode the binary-encoded XML data before the XML data is parsed.

Typically, the XPath evaluator decodes the XML data by means of a standard XML decoder component provided by the database system. The XML decoder component may be integrated into an XML parser, especially when the XML parser is a system-provided component used for a variety of other purposes.

After decoding, the XPath evaluator parses the XML input stream. The XPath evaluator may parse the XML input stream with, for example, an XML parser provided by the database system or an XML parser that is internal to the XPath evaluator. The XPath evaluator then evaluates the parsed XML data against the set of XPath expressions. Typically, this process involves evaluating each element, attribute, or value in the parsed XML data against a compiled representation of the set of XPath expressions. For example, the XML evaluator or an XML parser may generate XML events for each and every element or attribute it finds in the parsed XML data. The XPath evaluator may then evaluate these events, one-by-one, with the compiled XPath representation. For each event, the XML evaluator uses the compiled XPath representation to determine whether the event matches a next unmatched step (i.e. constraint) in each XPath expression. When the compiled XPath representation indicates that all steps in an XPath expression have been matched, it generates an XPath result.

A state machine, such as a non-finite automaton (NFA), is an example compiled XPath representation. The states and state transitions of the state machine may reflect each constraint in one or more XPath expressions. Based on the parsed XML data, the XPath evaluator transitions the state machine between its various states. When the state machine is in an accepting state, XPath evaluator generates an XPath result.

Example XPath Evaluation

In the present example, the following nodes in the purchase order table are identified using a compiled XPath representation (such as an NFA): '/PurchaseOrder/LineItems/LineItem/@ItemNumber' and '/PurchaseOrder/LineItems/LineItem/Description'. Ultimately, if there are ten (10) LineItem elements that have an ItemNumber attribute equal to 125, then execution of Query A will return ten (10) 'Description' elements.

According to an approach for scalar value extraction, when the compiled XPath representation indicated that all steps in '/PurchaseOrder/LineItems/LineItem/@ItemNumber' have been matched, a function to extract the scalar value of the ItemNumber attribute is called. This function is referred to herein as fn:string( ). The semantics of fn:string( ) are to concatenate all text descendants of a specified XML node. The execution of fn:string( ) is relatively expensive because each text descendant is evaluated using a general purpose XPath evaluation engine. The execution of fn:string( ) typically entails significant preliminary processing, such as establishing a state machine. When many scalar values are required to be extracted from an XML input stream, this type of evaluation resulted in poor performance.

According to an embodiment of the invention, node information is identified and analyzed to determine whether a particular node is simple or complex. In an embodiment, the node information that indicates whether the particular node is simple or complex may be in the encoding of "start element" tag of the particular node. If the particular node is simple, then the fn:string( ) function is not called to extract the scalar value of the particular node. Thus, it is immediately known whether the particular node is simple or complex without having to read the entire node (e.g., up until the "end element" tag). Without this information in the encoding, the construction of an "expensive" NFA to evaluation fn:string( ) cannot be avoided. Instead, the scalar value of the particular node is immediately available as part of the binary-encoded XML data.

In many cases, the node identified by an XPath is one that has a single text child. In all such cases, a simple examination of the encoded node can be used to obtain the scalar value for that node. Therefore, the entire process of preparing for traversing text descendants using a general purpose XPath evaluation engine may be avoided.

Therefore, with respect to the present example, once an ItemNumber node is identified and it is determined (i.e., using node information associated with that node) that the node is simple, the scalar value of the ItemNumber node is decoded, if not already done so.

In an embodiment, a node is not yet decoded when the simple/complex determination is made. This is possible according to one or more of the streaming evaluation techniques disclosed in U.S. patent application Ser. No. 11/950,642, filed Dec. 5, 2007, entitled "Efficient Streaming Evaluation Of XPaths On Binary-Encoded XML Schema-Based Documents" by Idicula et al., the entire contents of which are hereby incorporated by reference for all purposes as if fully set forth herein.

Data Type Conversion

In some cases, the schema of an XML document is unknown. In such cases, the XML data of such XML documents are typically stored as strings. Thus, after extracting the scalar value of a node identified by an XPath, the resulting string is converted to the data type identified in the query. In the present example, if the schema of purchase order documents is not known, then each extracted scalar value associated with an ItemNumber attribute is converted to a number data type.

In other cases, the schema of an XML document is known. In such cases, the XML data of such XML documents are stored according to the data types. Thus, after extracting the scalar value of node identified by an XPath, the extracted value need not be converted. In the present example, if the schema of purchase order documents is known and the schema specifies that each ItemNumber attribute is of data type number, then each extracted scalar value associated with an ItemNumber attribute is not converted to another data type.

However, a query may specify a data type of a node (identified in the query) that is different than the data type of the node as specified in the schema corresponding to that node. In such a case, the extracted value of the node may be cast (if possible) into a value of the data type specified in the query.

Hardware Overview

Figure 2:
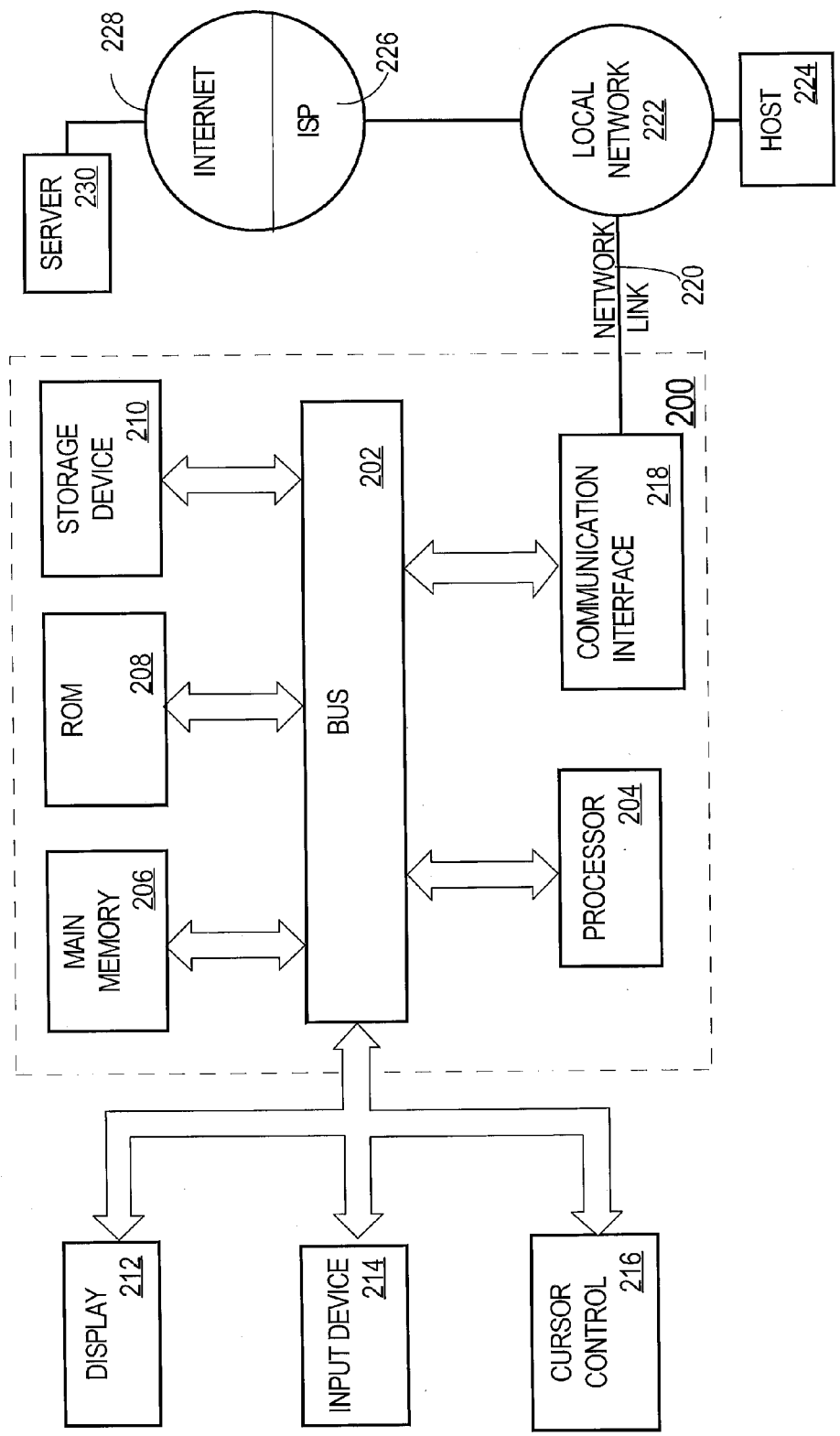
FIG. 2 is a block diagram that depicts a computer system upon which an embodiment of the invention may be implemented.

FIG. 2 is a block diagram that depicts a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to storage media and transmission media. Storage media includes both non-volatile media and volatile media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving a query that requires one or more XML nodes that are binary-encoded;
   in response to receiving the query, requesting binary-encoded XML data from one or more data sources, wherein the binary-encoded XML data is a compact binary representation of textual XML data;
   determining that a particular node reflected in the binary-encoded XML data satisfies one or more criteria of the query;
   after determining that the particular node satisfies one or more criteria of the query and before extracting content of the particular node, determining whether the particular node is simple or complex, wherein a node is simple if the node has no child elements and no associated attributes, wherein a node is complex if the node has at least one child element or at least one attribute;
   if it is determined that the particular node is complex, then extracting, from the binary-encoded XML data, a scalar value of the particular node by performing a first set of one or more operations;
   if it is determined that the particular node is simple, then extracting, from the binary-encoded XML data, a scalar value of the particular node without performing the first set of one or more operations;
   wherein the method is performed by one or more computing devices.

2. The method of claim 1, wherein extracting the scalar value comprises converting the scalar value of the particular node into a non-binary-encoded format.

3. The method of claim 2, wherein converting the scalar value of the particular node into a non-binary-encoded format is performed after the scalar value is identified.

4. The method of claim 1, wherein performing the first set of one or more operations comprises using an XPath evaluation engine to evaluate any text descendants of the particular node.

5. The method of claim 1, wherein extracting the scalar value comprises converting the scalar value into a particular data type that is specified in the query or that is specified in an XML schema associated with the binary-encoded XML data.

6. The method of claim 5, wherein:
   before converting, the data type of the scalar value is a string; and
   the particular data type is one of a number data type, a date data type, a float data type, or a Boolean data type.

7. The method of claim 1, further comprising:
   before receiving the query, storing XML data according to data types specified in an XML schema to which the XML data conforms, wherein converting the scalar value to a different data type is unnecessary.

8. The method of claim 1, wherein determining whether the particular node is simple is based on node information that is stored within the binary-encoded XML data or within an XML schema to which the binary-encoded XML data conforms.

9. A computer-implemented method comprising:
   determining that a node in an XML representation contains an XML value to extract, wherein the XML representation is a compact representation of an XML document that comprises textual XML data;
   wherein the XML representation is a binary-encoding of one or more nodes of the XML document;
   before extracting the XML value, determining whether the node is simple or complex, wherein a node is simple if the node has no child elements and no associated attributes, wherein a node is complex if the node has at least one child element or at least one attribute;

if it is determined that the node is complex, then extracting, from the XML representation, content of the node by performing a first set of one or more operations; and if it is determined that the node is simple, then extracting, from the XML representation, content of the node without performing the first set of one or more operations;

wherein the method is performed by one or more computing devices.

10. The method of claim 1, wherein:

performing the first set of one or more operations comprises generating a state machine.

11. The method of claim 9, wherein:

performing the first set of one or more operations comprises generating a state machine.

12. One or more non-transitory machine-readable storage media storing instructions which, when executed by one or more processors, cause:

receiving a query that requires one or more XML nodes that are binary-encoded;

in response to receiving the query, requesting binary-encoded XML data from one or more data sources, wherein the binary-encoded XML data is a compact binary representation of textual XML data;

determining that a particular node reflected in the binary-encoded XML data satisfies one or more criteria of the query;

after determining that the particular node satisfies one or more criteria of the query and before extracting content of the particular node, determining whether the particular node is simple or complex, wherein a node is simple if the node has no child elements and no associated attributes, wherein a node is complex if the node has at least one child element or at least one attribute;

if it is determined that the particular node is complex, then extracting, from the binary-encoded XML data, a scalar value of the particular node by performing a first set of one or more operations;

if it is determined that the particular node is simple, then extracting, from the binary-encoded XML data, a scalar value of the particular node without performing the first set of one or more operations.

13. The one or more non-transitory machine-readable storage media of claim 12, wherein extracting the scalar value comprises converting the scalar value of the particular node into a non-binary-encoded format.

14. The one or more non-transitory machine-readable storage media of claim 13, wherein converting the scalar value of the particular node into a non-binary-encoded format is performed after the scalar value is identified.

15. The one or more non-transitory machine-readable storage media of claim 12, wherein performing the first set of one or more operations comprises using an XPath evaluation engine to evaluate any text descendants of the particular node.

16. The one or more non-transitory machine-readable storage media of claim 12, wherein extracting the scalar value comprises converting the scalar value into a particular data type that is specified in the query or that is specified in an XML schema associated with the binary-encoded XML data.

17. The one or more non-transitory machine-readable storage media of claim 16, wherein:

before converting, the data type of the scalar value is a string; and the particular data type is one of a number data type, a date data type, a float data type, or a Boolean data type.

18. The one or more non-transitory machine-readable storage media of claim 12, wherein the instructions, when executed by one or more processors, further cause:

before receiving the query, storing XML data according to data types specified in an XML schema to which the XML data conforms, wherein converting the scalar value to a different data type is unnecessary.

19. The one or more non-transitory machine-readable storage media of claim 12, wherein determining whether the particular node is simple is based on node information that is stored within a subset of the binary-encoded XML data or within an XML schema to which the binary-encoded XML data conforms.

20. The one or more non-transitory machine-readable storage media of claim 12, wherein:

performing the one or more operations comprises generating a state machine.

21. One or more non-transitory machine-readable storage media storing instructions which, when executed by one or more processors, cause:

determining that a node in an XML representation contains an XML value to extract, wherein the XML representation is a compact representation of an XML document that comprises textual XML data;

wherein the XML representation is a binary-encoding of one or more nodes of the XML document;

before extracting the XML value, determining whether the node is simple or complex, wherein a node is simple if the node has no child elements and no associated attributes, wherein a node is complex if the node has at least one child element or at least one attribute;

if it is determined that the node is complex, then extracting, from the XML representation, content of the node by performing a first set of one or more operations; and if it is determined that the node is simple, then extracting, from the XML representation, content of the node without performing the first set of one or more operations.

22. The one or more non-transitory machine-readable storage media of claim 21, wherein:

performing the first set of one or more operations comprises generating a state machine.

23. The one or more non-transitory method of claim 1, wherein the steps of determining and extracting are performed while streaming the binary-encoded XML data.

24. The one or more non-transitory machine-readable storage media of claim 12, wherein determining and extracting are performed while streaming the binary-encoded XML data.

25. The method of claim 1, wherein:

extracting the scalar value of the particular node by performing the first set of one or more operations if the particular node is complex comprises reading an end element tag of the particular node; and extracting the scalar value of the particular node if the particular node is simple is performed without having to read the end element tag of the particular node.

26. The one or more non-transitory machine-readable storage media of claim 12, wherein:

extracting the scalar value of the particular node by performing the first set of one or more operations if the particular node is complex comprises reading an end element tag of the particular node; and extracting the scalar value of the particular node if the particular node is simple is performed without having to read the end element tag of the particular node.

* * * * *

UNITED STATES PATENT AND TRADEMARK OFFICE
CERTIFICATE OF CORRECTION

PATENT NO. : 8,429,196 B2  
APPLICATION NO. : 12/134196  
DATED : April 23, 2013  
INVENTOR(S) : Chandrasekar et al.

Page 1 of 1

It is certified that error appears in the above-identified patent and that said Letters Patent is hereby corrected as shown below:

On Title page 3, in column 1, under "Other Publications", line 33, delete "Pulished" and insert -- Published --, therefor.

On Title page 3, in column 2, under "Other Publications", line 15, delete "SIGMOND" and insert -- SIGMOD --, therefor.

Signed and Sealed this  
Sixth Day of August, 2013

Teresa Stanek Rea  
*Acting Director of the United States Patent and Trademark Office*